US012777034B2

(12) United States Patent
Buglio et al.

(10) Patent No.: US 12,777,034 B2
(45) Date of Patent: Oct. 27, 2026

(54) UNAUTHORIZED ACTIVITY DETECTION BASED ON PASSIVE AUTHENTICATION

(71) Applicant: Bank of America Corporation, Charlotte, NC (US)

(72) Inventors: Anthony James Buglio, Chicago, IL (US); Frank Yanan, Wheaton, IL (US); Khushbu Bansal, Bolingbrook, IL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/179,257

(22) Filed: Apr. 15, 2025

(65) Prior Publication Data

US 2026/0322800 A1 Oct. 15, 2026

(51) Int. Cl.
*H04L 9/40* (2022.01)

(52) U.S. Cl.
CPC .................................. *H04L 63/083* (2013.01)

(58) Field of Classification Search
CPC ..................................................... H04L 63/083
See application file for complete search history.

(56) References Cited

U.S. PATENT DOCUMENTS

| | | | |
|---|---|---|---|
| 8,078,143 B2 | 12/2011 | Kaplan | |
| 8,578,457 B2 | 11/2013 | Kan | |
| 9,030,290 B2 | 5/2015 | Keranen et al. | |
| 10,951,606 B1 * | 3/2021 | Shahidzadeh | H04L 63/107 |
| 2013/0010962 A1 | 1/2013 | Buer et al. | |
| 2022/0075862 A1 * | 3/2022 | Torre | G06F 21/32 |
| 2022/0358192 A1 * | 11/2022 | Upadhyay | G06V 10/75 |

* cited by examiner

*Primary Examiner* — Sangseok Park
(74) *Attorney, Agent, or Firm* — Banner & Witcoff, Ltd.

(57) ABSTRACT

Arrangements for unauthorized activity detection based on passive authentication are provided. In some examples, a computing platform may receive initial authentication data from a user computing device. The platform may authenticate a user associated with the user computing device based on the initial authentication data and may activate passive authentication processes, such as activating one or more devices. At a first time after the initial authentication of the user, user presence data may be received and scored. At the first time, user interaction data associated with one or more user interactions with the user computing device may be received and scored. An overall score may be determined and compared to a threshold. If the overall score is above the threshold, the process may return to capture and analyze additional data. If the overall score is below the threshold, one or more mitigation actions may be identified and executed.

20 Claims, 9 Drawing Sheets

UNAUTHORIZED ACTIVITY DETECTION BASED ON PASSIVE AUTHENTICATION

BACKGROUND

Aspects of the disclosure relate to electrical computers, systems, and devices for unauthorized activity detection based on passive authentication.

Conventional authentication arrangements validate a user identity only during an initial login process. Once authenticated, conventional systems do not validate the identity again. This can create a security risk when a user leaves a computing device unattended, when an unauthorized actor has user login credentials and can impersonate the user at login, and the like. This can lead to compromise of sensitive information, modification in user access, bypassing security controls, and the like.

While some systems may include static time outs or other session expiration processes, these can be disruptive to a user because they may require the user to input the initial login credentials again. Further, these arrangements do not provide additional security when an unauthorized actor has access to user credentials. Accordingly, it would be advantageous to provide passive authentication of a user, e.g., throughout a workday or session, that may be based on characteristics of the user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with accurately authenticating and validating user identities.

In some examples, a computing platform having at least one processor and memory may receive initial authentication data from a user computing device. The computing platform may authenticate a user associated with the user computing device based on the initial authentication data and, after authenticating the user, may activate or initiate passive authentication processes. In some examples, activating or initiating passive authentication processes may include activating one or more devices, such as an image capture device, a LiDAR sensor, or the like.

At a first time (e.g., after the initial authentication of the user to the user computing device) user presence data may be received and scored. At the first time, user interaction data associated with one or more user interactions with the user computing device may be received and scored. An overall score may be determined and compared to a threshold. If the overall score is above the threshold, the process may return to capture and analyze additional data. If the overall score is below the threshold, one or more mitigation actions may be identified and executed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, conventional authentication systems often only validate an identity of a user at an initial login, or rely too heavily on user login credentials to validate a user identity. Accordingly, arrangements provided herein include passive authentication based on characteristics of the user. The passive authentication processes may be performed on a continuous basis, near continuous basis, or at various intervals throughout a workday or computer session. The passive authentication processes described herein provide non-intrusive validation of a user based on characteristics such as biometric data, user behaviors, and the like.

For instance, after a user has initially been logged in to a computing device, passive authentication processes may begin. In some examples, user presence data may be received from one or more devices, such as image capture devices, light detection and ranging (LiDAR) sensors, mobile devices of the user, and the like. Further, user interaction data associated with user interactions with the computing device may be received. For instance, typing speeds or patterns, mouse speeds, and the like, may be received and compared to baseline or expected data for the user. The user presence data and user interaction data may be analyzed to determine whether the user is validated. If so, the process may continue to receive and analyze additional data. If not, one or more mitigation actions may be identified and executed.

These and various other arrangements will be discussed more fully below.

Figure 1A:
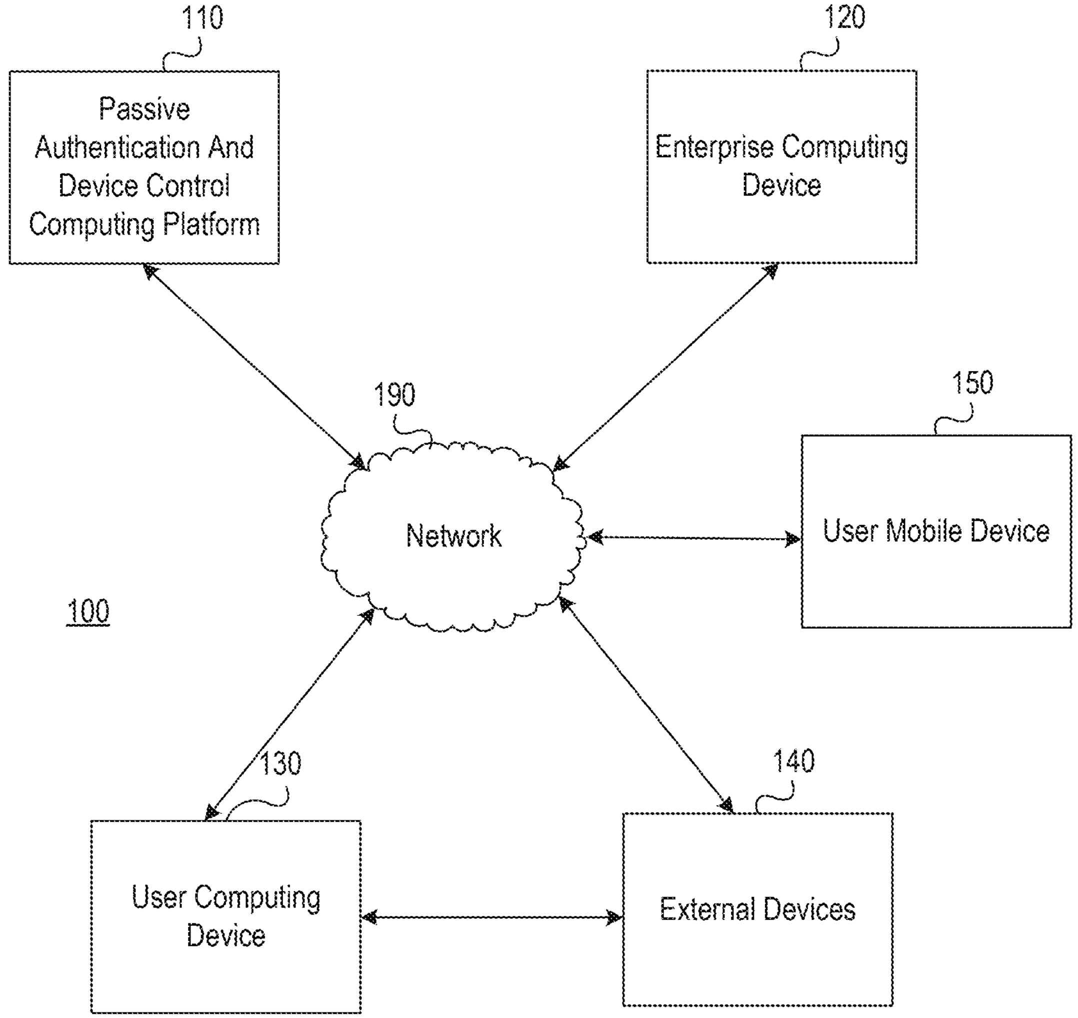
FIGS. 1A-1B depict an illustrative computing environment for unauthorized activity detection based on passive authentication in accordance with one or more aspects described herein.
Figure 1B:
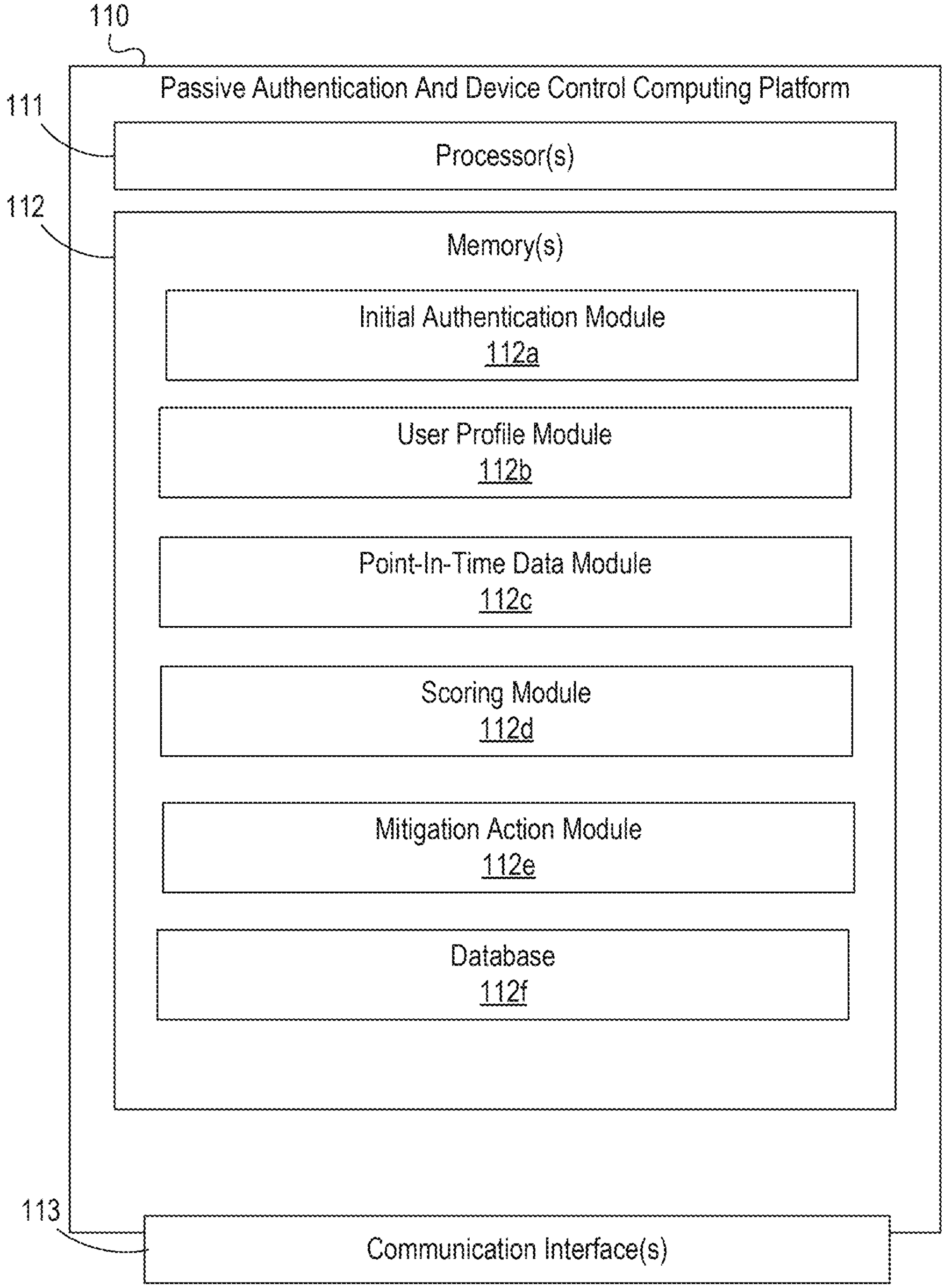

FIGS. 1A-1B depict an illustrative computing environment and devices for passive authentication in accordance with one or more aspects described herein. Referring to FIG. 1A, computing environment 100 may include one or more computing devices and/or other computing systems. For example, computing environment 100 may include passive authentication and device control computing platform 110, enterprise computing device 120, user computing device 130, external devices 140 and/or user mobile device 150.

Although one enterprise computing device 120, one user computing device 130, one representation of external devices 140, and one user mobile device are shown, any number of systems or devices may be used without departing from the invention.

Passive authentication and device control computing platform 110 may be or include one or more computer components (e.g., servers, server blade, processor, memory, and the like) and may be configured to perform intelligent, dynamic, real-time passive authentication actions. For instance, passive authentication and device control computing platform 110 may receive data from a plurality of devices (e.g., a user workstation computing device, a mobile device of a user, external devices arranged at a workstation of a user, and the like) and may build a user profile associated with the user. For instance, user interaction data such as typing speed and/or patterns, mouse use, and the like, as well as biometric data of the user (e.g., facial recognition, iris scan, fingerprint, and/or other biometric measures), may be used to generate or build a user profile including baseline user interaction data, user biometric data, and the like.

Passive authentication and device control computing platform 110 may further receive, after building the user profile and after an initial authentication of a user to a workstation device (e.g., user computing device 130), for instance, after a user logs in using, for instance, a username and password, additional user interaction data (e.g., mouse data, keyboard data, and the like), biometric data (e.g., image data, wearable device data), user presence data (e.g., LiDAR data, or the like) and may compare the received data to the baseline data. For instance, user interaction data may be compared to baseline user interaction data from a user profile to detect any anomalies. In some examples, user interaction data may be scored to determine how closely the received data matches the baseline data.

Further, passive authentication and device control computing platform 110 may receive user presence data, such as LiDAR data from a LiDAR sensor (e.g., external device 140), image data indicating a presence of user, and the like. In some examples, the user presence data may be scored. For instance, a score of 1 may be generated if the user is present based on the user presence data and a score of 0 may be generated if the user is not present.

In some examples, user presence data may include mobile device proximity data that may be received by the passive authentication and device control computing platform 110. For instance, one or more registered mobile devices 150 (e.g., a smartphone of a user, a wearable device of a user, or the like) may be monitored to determine whether the mobile device 150 is within proximity of the workstation (e.g., user computing device 130). If the device is detected, the user may remain logged in. If the device is not detected and at least a threshold amount of time has passed, one or more mitigating actions may be executed.

In some examples, the user interaction data, user presence data, proximity data, and the like, may be received and analyzed on a continuous or near-continuous basis in order to analyze the data in real-time and executing mitigation actions efficiently. Additionally or alternatively, the data may be received on a periodic or aperiodic basis and analyzed to identify potential issues, potential unauthorized activity, and the like.

Upon detection of an anomaly in the data (e.g., a score below a threshold, presence data indicating the user is not present, or the like), passive authentication and device control computing platform 110 may identify and/or execute one or more mitigation actions. For instance, passive authentication and device control computing platform 110 may transmit a signal causing the user to be locked out of a workstation (e.g., user computing device 130) until a user identity may be confirmed. Additionally or alternatively, passive authentication and device control computing platform 110 may cause an authentication pop-up to be displayed on a display of the user computing device 130 that may require input of additional authentication data (e.g., username and password, personal identification number, biometric data, or the like).

Enterprise computing device 120 may be or include one or more computer components and/or computing devices (e.g., processor, memory, laptop computers, desktop computers, mobile devices, tablet devices, or the like) and may be associated with the enterprise organization. In some examples, enterprise computing device 120 may be associated with an administrator who may be notified of potential unauthorized activity at a device.

User computing device 130 may be or include one or more computing devices e.g., laptop computers, desktop computers, mobile devices, tablet devices, wearable devices, or the like) associated with an enterprise organization and a user (e.g., an employee) thereof. The user computing device 130 may be used by the user throughout the course of a business day in order to conduct business activities.

External devices 140 may be or include one or more external devices arranged at a workstation and configured to monitor for a presence of a user. For instance, an image capture device, one or more LiDAR sensors, a heat monitoring sensor, and the like, may be arranged at a workstation to capture user presence data (e.g., image data providing an image of the workstation, LiDAR data indicating a presence of a user, or the like).

Mobile device 150 may be or include one or more mobile devices associated with the user of the user computing device 130, such as a smartphone, tablet, wearable device (e.g., smart watch) or the like). The mobile device 150 may be registered with the passive authentication and device control computing platform 110 and associated with the user. The mobile device 150 may be detectable by the user computing device 130 (e.g., by Bluetooth™, near-field communication, or the like) and detection (or lack of detection) of the mobile device 150 within a predefined range of the user computing device 130 (e.g., within one foot, within two feet, or the like) for at least a threshold amount of time (e.g., at least one minute, at least two minutes, at least five minutes, or the like) may indicate the user is no longer present at the user computing device 130 and may cause a mitigation action to be identified and executed.

As mentioned above, computing environment 100 also may include one or more networks, which may interconnect one or more of passive authentication and device control computing platform 110, enterprise computing device 120, user computing device 130, external device(s) 140, and/or mobile device 150. For example, computing environment 100 may include network 190. Network 190 may, in some examples, be a private network and include one or more sub-networks (e.g., Local Area Networks (LANs), Wide Area Networks (WANs), or the like). In some examples, network 190 may be a public network or may include a public network and private network in communication with each other. Network 190 may interconnect one or more computing devices associated with the organization and/or external to the organization. For example, passive authentication and device control computing platform 110, enterprise computing device 120, user computing device 130, external device(s) 140, and/or mobile device 150 may be connected via network 190.

Referring to FIG. 1B, passive authentication and device control computing platform 110 may include one or more processors 111, memory 112, and communication interface 113. A data bus may interconnect processor(s) 111, memory 112, and communication interface 113. Communication interface 113 may be a network interface configured to support communication between passive authentication and device control computing platform 110 and one or more networks (e.g., network 190, or the like). Memory 112 may include one or more program modules having instructions that when executed by processor(s) 111 cause passive authentication and device control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of passive authentication and device control computing platform 110 and/or by different computing devices that may form and/or otherwise make up passive authentication and device control computing platform 110.

For example, memory 112 may have, store and/or include initial authentication module 112*a*. Initial authentication module 112*a* may store instructions and/or data that may cause or enable the passive authentication and device control computing platform 110 to receive, from the user computing device 130, login credentials of a user. For instance, upon initial login of the user at the user computing device 130, the user may provide a username and password, which may be authenticated by the initial authentication module 112*a* (e.g., compared to prestored data to ensure a match). Responsive to authenticating the user with the initial data, passive authentication and device control computing platform 110 may initiate or activate passive authentication processes which may include activating one or more external devices 140 (e.g., LiDAR sensor, image capture device or camera, or the like) at or near the user computing device 130. Initiating or activating passive authentication processes may further include initiating receipt of user interaction data, and the like.

Passive authentication and device control computing platform 110 may further have, store and/or include user profile module 112*b*. User profile module 112*b* may store instructions and/or data that may cause or enable the passive authentication and device control computing platform 110 to generate a user profile based on received user interaction data (e.g., mouse data, keyboard data, biometric data, and the like), as well as additional data, such as common work location (e.g., based on geolocation data), regular business or working hours/days of the user, and the like. The data may be used to generated expected or baseline data of the user and may be stored (e.g., in database 112*f*).

Passive authentication and device control computing platform 110 may further have, store and/or include point-in-time data module 112*c*. Point-in-time data module 112*c* may receive, from the user computing device 130, external devices 140, mobile device 150, and the like, point-in-time (e.g., real-time or near real-time) user interaction data with the user computing device 130, user presence data at the user computing device 130, and the like.

Passive authentication and device control computing platform 110 may further have, store and/or include scoring module 112*d*. Scoring module 112*d* may store instructions and/or data that may cause or enable the passive authentication and device control computing platform 110 to score each factor from the received point-in-time data received. For instance, scoring module 112*d* may retrieve the user profile for a respective user and may score each factor such as, typing speed, mouse speed, biometric data, and the like, as compared to baseline data from the user profile. The score may be any value between 0 and 1 based on a similarity between the received data and the baseline or expected data, with 1 being a perfect match and 0 indicating no match. Scoring module 112*d* may further score the user presence data received from external device 140 such as a camera or other image capture device, biometric scanner, LiDAR sensor, mobile device 150 proximity data, or the like. In some examples, scoring the presence data may include generating a score of 1 if the user is present based on the data or 0 if the user is not present. The score generated for user presence data may be a binary 0 or 1, rather than a range between 0 and 1 as with the user interaction data. Scoring module 112*d* may, in some examples, sum the scores for each factor to identify an overall score for that particular point-in-time. The overall score may be compared to a threshold and, if the overall score is at or above the threshold, the user may be considered passively authenticated. If the score is below the threshold, one or more mitigation actions may be identified and executed.

In some examples, one or more factors being scored may have a greater weight than one or more other factors. For instance, a 0 value or any of the user presence data based on external device 140 (e.g., camera, LiDAR, mobile device proximity, or the like) may carry greater weight as more confidence can be placed in the user not being present based on this data, rather than a change in typing speed or the like. Accordingly, in some examples, if one factor of the user presence data indicates the user is not present, mitigation actions may be executed to avoid any unauthorized activity.

Passive authentication and device control computing platform 110 may further have, store and/or include mitigation action module 112*e*. Mitigation action module 112*e* may store instructions and/or data that may cause or enable the passive authentication and device control computing platform 110 to identify and execute one or more mitigation actions on the user computing device 130. For instance, mitigation action module 112*e* may identify that a user should be locked out of the user computing device and may generate a command or signal causing the user computing device 130 to lock out the user. Additionally or alternatively, mitigation action module 112*e* may cause a pop-up interface to be displayed by the user computing device 130 requesting input of additional authentication data. Various other mitigation actions may be used without departing from the invention.

Passive authentication and device control computing platform 110 may further have, store and/or include database 112*f*. Database 112*f* may store data related to user profiles, user baseline or expected data, received point-in-time data, scoring data, mitigation action data and/or any other data to perform the functions of passive authentication and device control computing platform 110.

FIGS. 2A-2D depict one example illustrative event sequence for passive authentication in accordance with one or more aspects described herein. The events shown in the illustrative event sequence are merely one example sequence and additional events may be added, or events may be omitted, without departing from the invention. Further, one or more processes discussed with respect to FIGS. 2A-2D may be performed in real-time or near real-time.

Figure 2A:
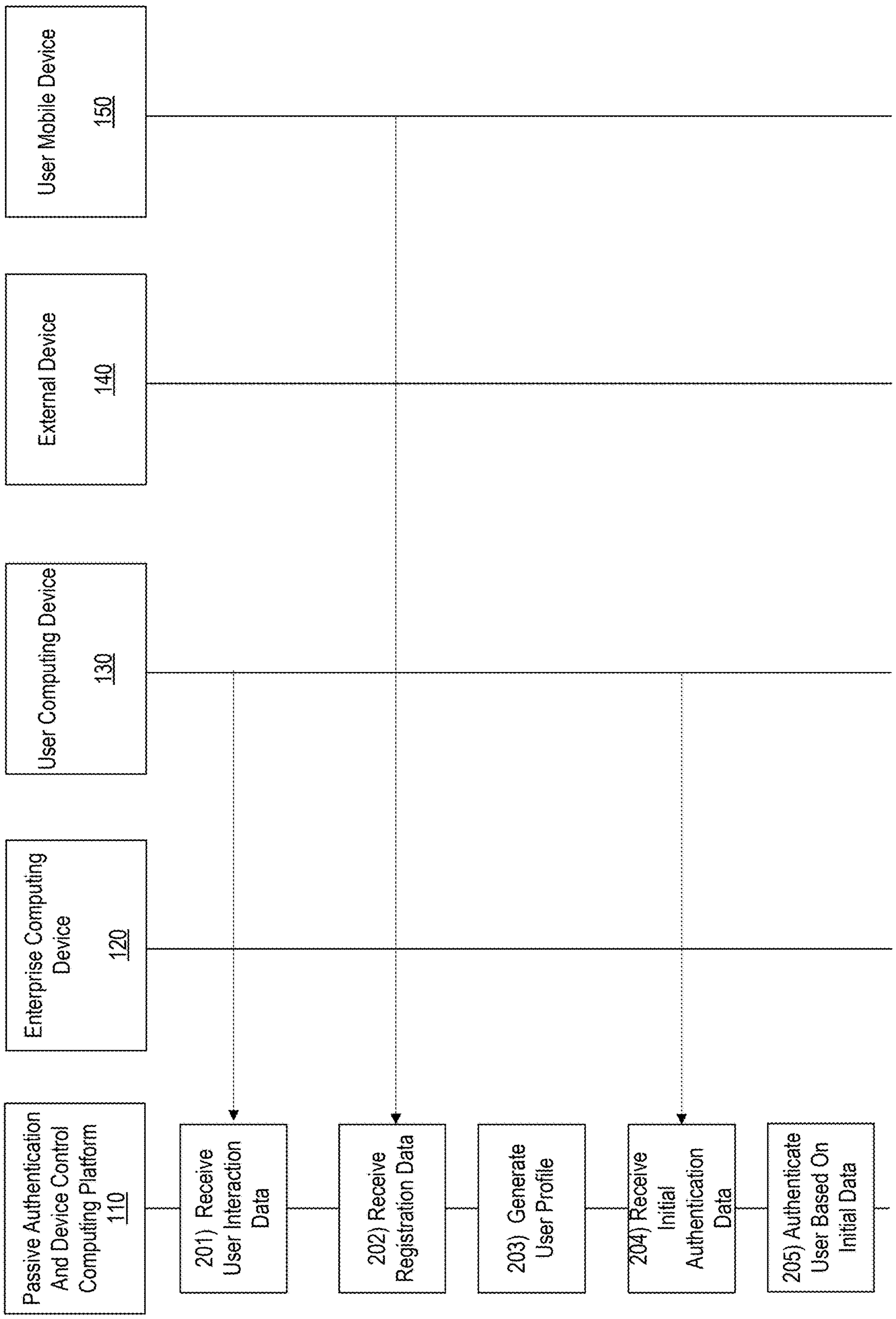
FIGS. 2A-2D depict an illustrative event sequence for unauthorized activity detection based on passive authentication in accordance with one or more aspects described herein.

With reference to FIG. 2A, at step 201, passive authentication and device control computing platform 110 may receive user interaction data from, for instance, user computing device 130. The user interaction data may include typing speed, typing patterns and/or other keyboard-based data, mouse speed, mouse patterns, and/or other mouse input data, browsing history, applications accessed, and the like.

At step 202, passive authentication and device control computing platform 110 may receive registration data from one or more user mobile devices 150. For instance, a user may register a smart phone, smart watch or other wearable device, tablet computing device, or the like, with passive authentication and device control computing platform 110.

At step 203, passive authentication and device control computing platform 110 may generate a user profile for the user. For instance, passive authentication and device control computing platform 110 may generate a user profile including an identifier of the user, an identifier associated with user computing device 130, an expected location of a user (e.g., typical work location), expected or typical work hours of the user, as well as baseline or expected user interaction data generated based on the received user interaction data. In some examples, the user interaction data may be received over a threshold period of time before the baseline data or expected data is identified (e.g., two weeks, one month, or the like). In some arrangements, at least a predetermined amount of user interaction data may be received before identified baseline or expected data. Further, in some examples, baseline or expected data may be recalculated for a user on a periodic or aperiodic basis (e.g., every two weeks, every month, every six months, or the like) to ensure accuracy in user baseline data, account for any changes (e.g., gradual or otherwise associated with user patterns), and/or avoid false positives. The generated user profile may be stored.

At step 204, passive authentication and device control computing platform 110 may receive initial authentication data. For instance, passive authentication and device control computing platform 110 may receive, from user computing device 130, user credentials used to initially log in to user computing device 130 (e.g., at the start of a work day, or the like). The user credentials may include a username and password, biometric data, and the like. In some examples, multi-factor authentication may be used and may require more than one type of authentication data to be provided.

At step 205, passive authentication and device control computing platform 110 may authenticate the user based on the initial authentication data. For instance, passive authentication and device control computing platform 110 may compare the initial authentication data to prestored authentication data (e.g., in user profile) and, if the data matches, the user may be authenticated and the process may continue. If the data does not match, the process may end and a notification may be transmitted to, for instance, enterprise computing device 120, indicating that a potential issue has occurred. In some examples, a second (or other additional) attempt to initially authenticate may be provided to the user before the notification is sent to the enterprise computing device 120.

Figure 2B:
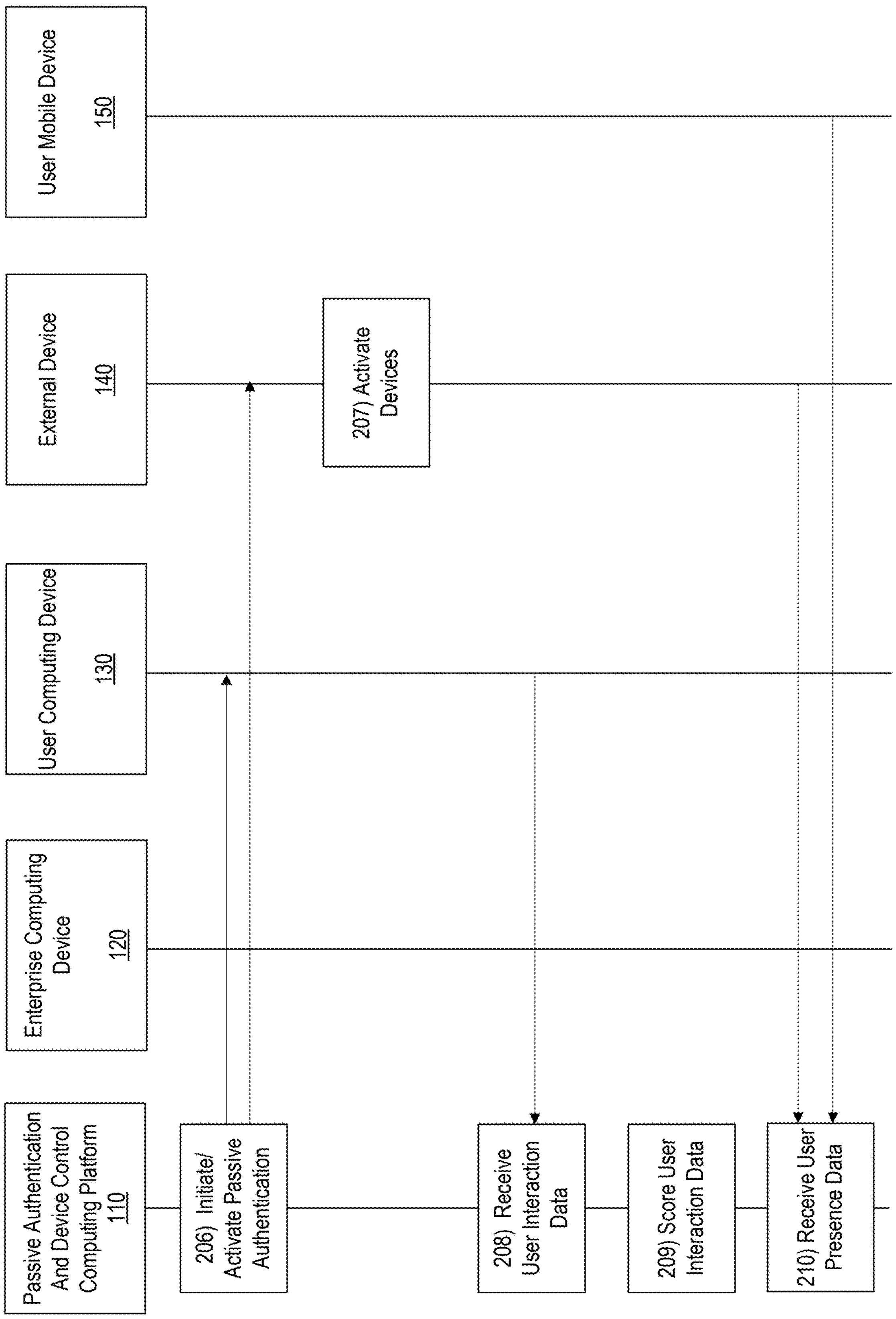

With reference to FIG. 2B, at step 206, passive authentication and device control computing platform 110 may activate or initiate passive authentication processes. In some examples, activating or initiating passive authentication may include transmitting a signal to one or more external devices (e.g., camera, LiDAR sensor, or the like) activating the one or more external devices and/or causing the one or more external devices to capture and transmit data to the passive authentication and device control computing platform 110 on a continuation basis, on a periodic basis, or the like. Activating or initiating passive authentication may further including causing user computing device 130 to transmit user interaction data throughout the course of the workday. Accordingly, user computing device 130 may capture user interaction data and may transmit it, in real-time or near real-time, to the passive authentication and device control computing platform 110 for analysis.

At step 207, one or more external devices 140 may be activated based on the instruction or signal received from the passive authentication and device control computing platform 110. For instance, a camera, LiDAR sensor, or the like, may be activated, powered on, or the like.

At step 208, passive authentication and device control computing platform 110 may receive user interaction data from user computing device 130. For instance, as the user types, uses their mouse, browses one or more websites, accesses one or more applications, or the like, user interaction data associated with each input device (e.g., keyboard, mouse) or user interaction may be captured and transmitted to the passive authentication and device control computing platform 110 for analysis. The data may be used to identify current, real-time or point-in-time typing speed, typing patterns, mouse speed, scrolling behavior, browsing behavior, applications accessed, and the like.

At step 209, passive authentication and device control computing platform 110 may score the user interaction data. For instance, passive authentication and device control computing platform 110 may retrieve the user profile associated with a user of user computing device 130. Passive authentication and device control computing platform 110 may then compare the received user interaction data to baseline or expected data from the user profile and may score the received user interaction data based on similarity to the baseline or expected data. In some examples, each type of user interaction data (e.g., typing speed, typing pattern, mouse speed, or the like) may be scored as compared to baseline or expected data for each type of interaction data. In some examples, the score may be a value between 0 and 1, with a score of 1 indicating a perfect or near perfect match between the received user interaction data at the point-in-time and the baseline or expected user interaction data, and a score of 0 indicating no match between the received data and the baseline or expected data. Values between 0 and 1 may indicate a similarity in the data, with scores closer to a value or 1 indicating more similarity between the user interaction data and the baseline data than scores closer to 0.

At step 210, passive authentication and device control computing platform 110 may receive user presence data. For instance, passive authentication and device control computing platform 110 may receive user presence data from one or more of, image capture device (e.g., facial image, or the like), LiDAR sensor, mobile device 150 within proximity of the user computing device 130, and the like. In some examples, image data received from a camera may be analyzed using facial recognition techniques to determine whether a user present in the image is the expected user (e.g., image data may be compared to prestored or other image data to recognize the user as the expected user). In some examples, a LiDAR sensor may provide a reliable indication of whether a user is present or not present at the user computing device 130. Further, passive authentication and device control computing platform 110 may receive an indication of whether one or more registered mobile devices, such as mobile device 150, are within a predefined range or proximity of the user computing device 130.

Figure 2C:
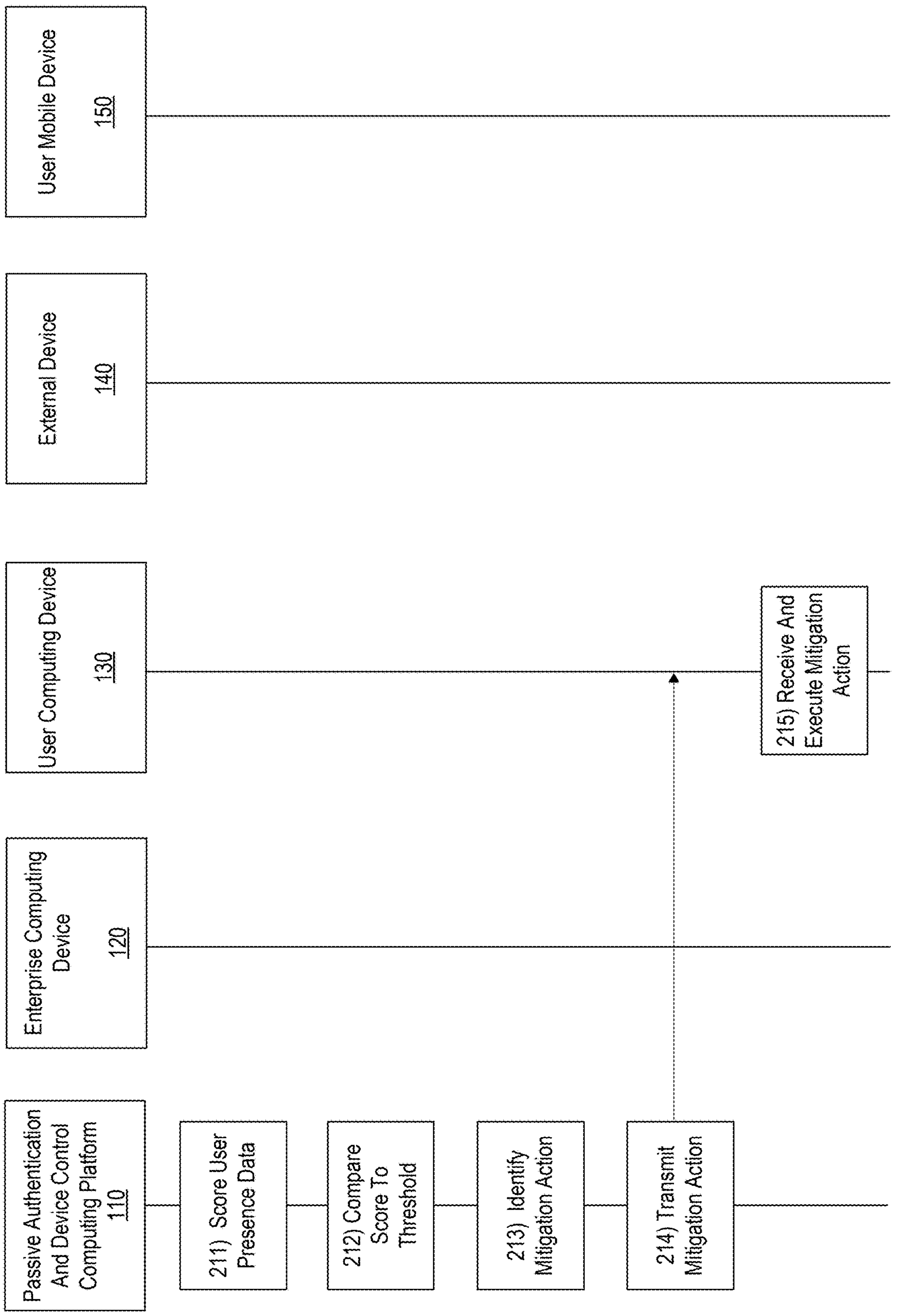

With reference to FIG. 2C, at step 211, passive authentication and device control computing platform 110 may score the received user presence data. For instance, passive authentication and device control computing platform 110 may score each type of user presence data received (e.g., image data, LiDAR data, mobile device proximity data, or the like). In some examples, the score may be a 0 or 1, with a score of 1 indicating a user presence and a score of 0 indicating the user is not present, based on each type of user presence data.

Once each type of user interaction data and user presence data is scored, an overall score may be determined by summing each of the scores for each type of user interaction data and user presence data. At step 212, passive authentication and device control computing platform 110 may compare the overall score to a passive authentication threshold. In some examples, the threshold may be customizable. Further, in some arrangements, the threshold may be modified (e.g., increased) based on a user's role within the enterprise organization, a value associated with transactions or other activities of the user (e.g., high value transactions, wire transfers, or the like may require greater confidence in validity of identity), or the like.

If the overall score is at or above the threshold, the process may return to step 208 to receive and analyze additional user interaction data and user presence data a later period in time. If the overall score is below the threshold, at step 213, passive authentication and device control computing platform 110 may identify one or more mitigation actions.

Figure 4:
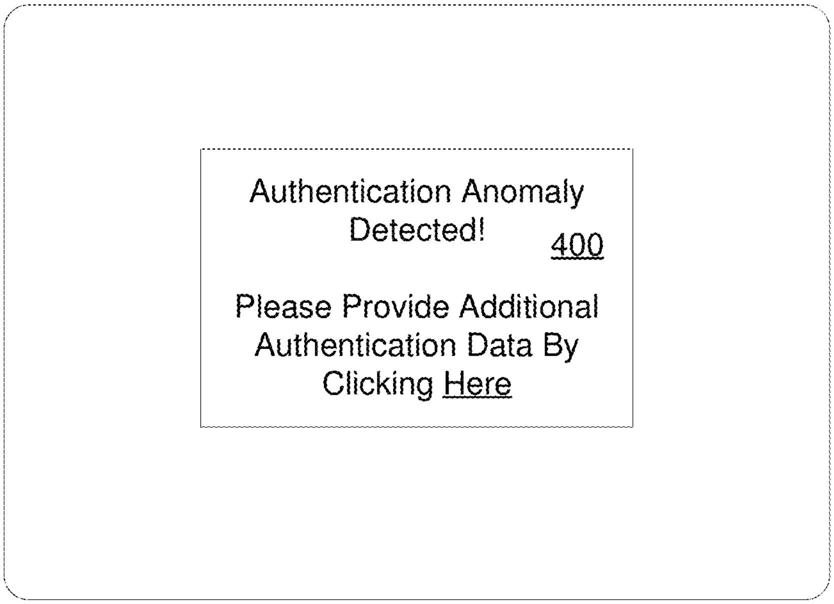
FIGS. 4 and 5 illustrate example user interfaces that may be generated in accordance with one or more aspects described herein.

For instance, passive authentication and device control computing platform 110 may identify one or more mitigation actions and may generate a signal, command or instruction to transmit to the user computing device 130 for execution. For instance, passive authentication and device control computing platform 110 may identify that the user computing device 130 should be locked out and the user should have to re-enter initial authentication data. Accordingly, passive authentication and device control computing platform 110 may generate a signal, instruction or command causing user computing device 130 to lock out the current user. In another example, passive authentication and device control computing platform 110 may identify that additional authentication data should be requested from a current user of user computing device 130. Accordingly, passive authentication and device control computing platform 110 may transmit or send an interface that may pop-up on a display of user computing device 130 and may require the user to input additional authentication data before the user can resume the current session on the user computing device 130. FIG. 4 illustrates one example pop-up interface 400 indicating that an authentication anomaly has been detected and providing a selectable link for the user to provide additional authentication data. Various other mitigation actions may be identified without departing from the invention.

At step 214, passive authentication and device control computing platform 110 may transmit or send the identified mitigation action to the user computing device 130. For instance, passive authentication and device control computing platform 110 may transmit or send the signal, instruction or command to user computing device 130 which may cause user computing device 130 to execute the instruction and associated mitigation action.

At step 215, user computing device 130 may receive and execute the mitigation action.

Figure 2D:
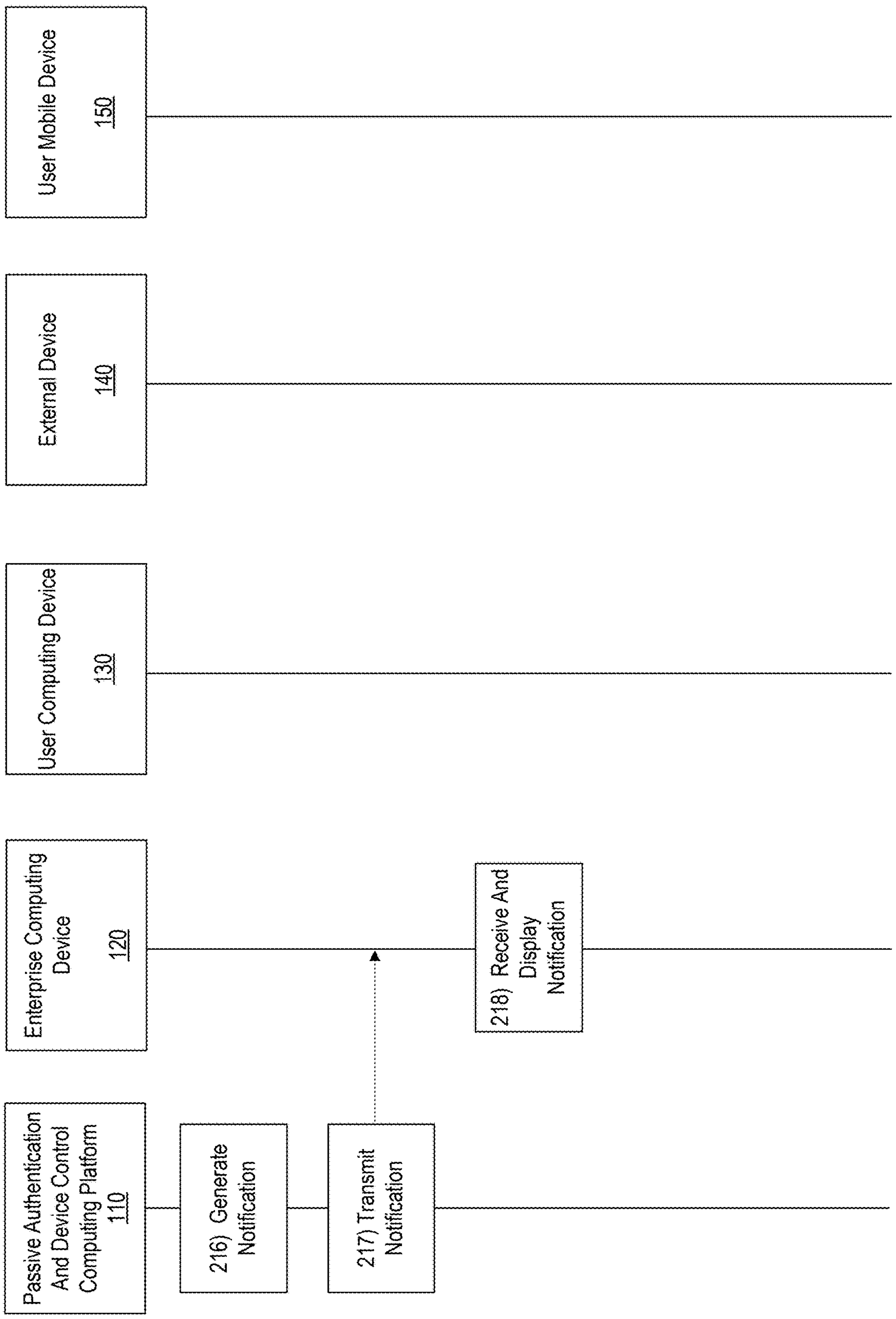
Figure 5:
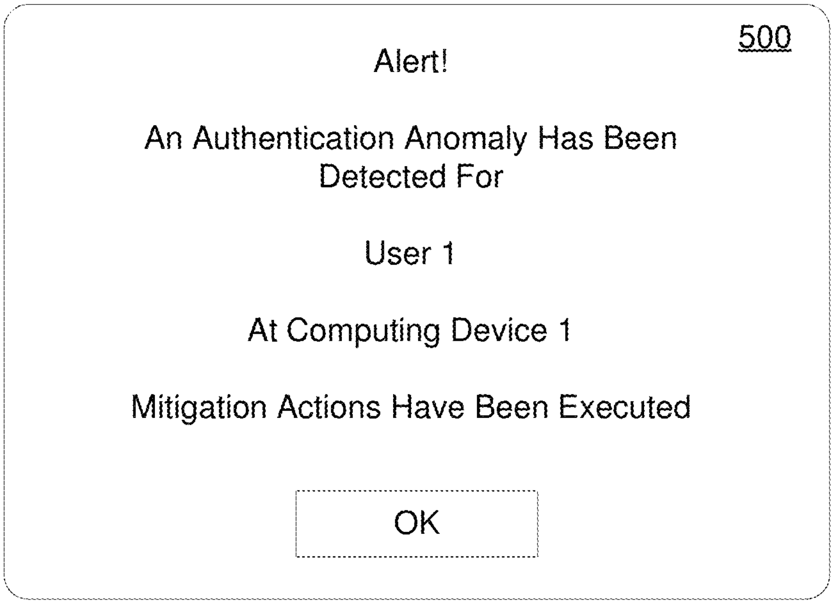

With reference to FIG. 2D, at step 216, passive authentication and device control computing platform 110 may generate a notification indicating that an anomaly was detected and a mitigation action was identified and executed. FIG. 5 illustrates one example notification 500 identifying a user and computing device associated with a detected authentication anomaly and indicating that mitigation actions have been executed.

At step 217, passive authentication and device control computing platform 110 may transmit or send the notification to enterprise computing device 120. In some examples, transmitting or sending the notification to enterprise computing device 120 may cause the enterprise computing device 120 to display the notification on a display of the enterprise computing device 120.

At step 218, enterprise computing device 120 may receive and display the notification.

Figure 3:
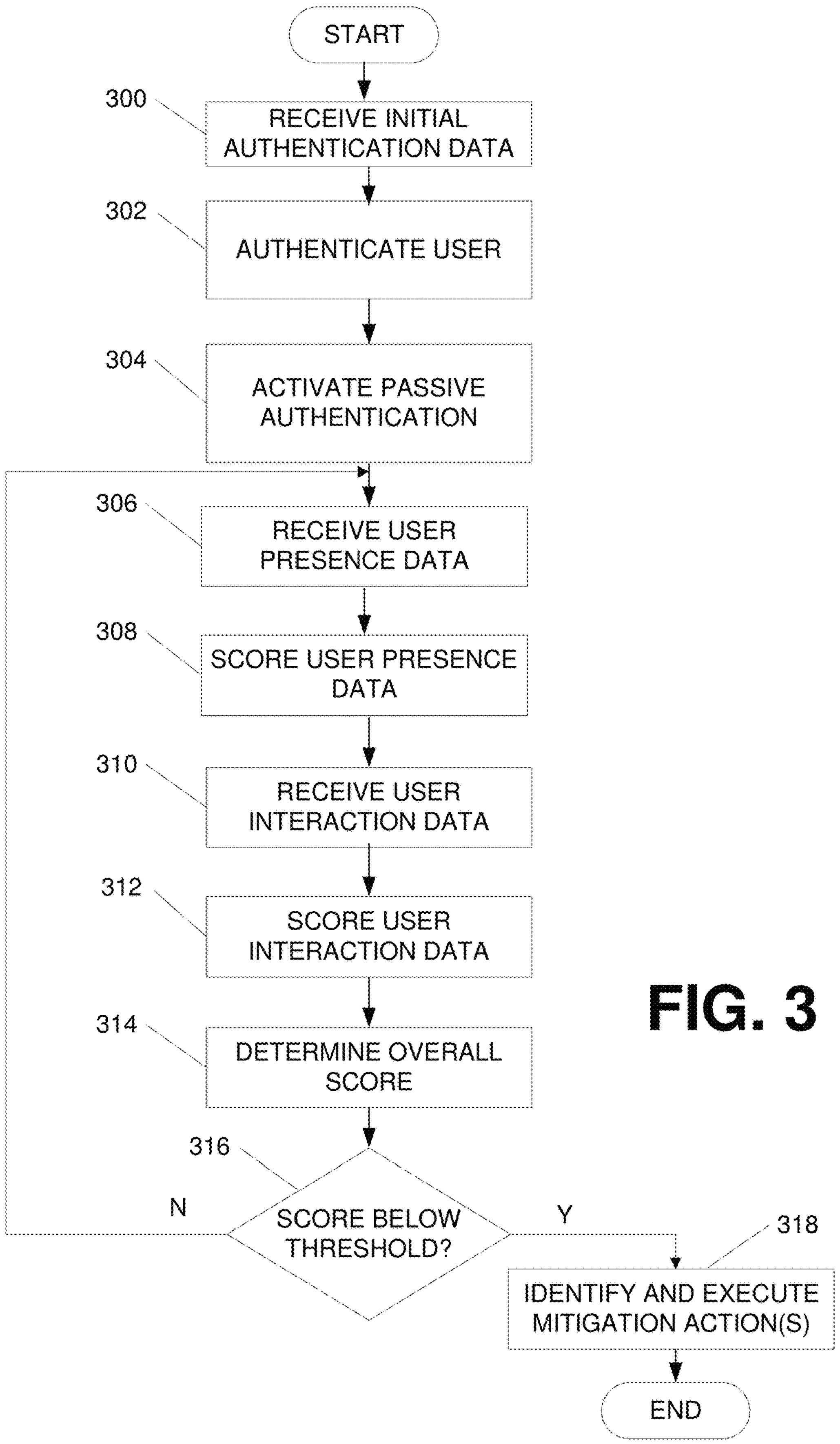
FIG. 3 illustrates an illustrative method for unauthorized activity detection based on passive authentication according to one or more aspects described herein.

FIG. 3 is a flow chart illustrating one example method of unauthorized activity detection based on passive authentication in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, passive authentication and device control computing platform 110 may receive initial authentication data from a user computing device. For instance, the passive authentication and device control computing platform 110 may receive a username and password of a user, biometric data, or the like, for a user associated with the user computing device.

At step 302, passive authentication and device control computing platform 110 may authenticate the user of the user computing device based on the initial authentication data. For instance, passive authentication and device control computing platform 110 may compare the initial authentication data to prestored authentication data to determine whether the data matches and the user is authenticated. If not, the process may end. If so, the process may proceed. In some examples, authenticating the user to the user computing device may provide the user access to one or more systems or applications via the user computing device (e.g., to conduct business throughout a workday).

At step 304, after authenticating the user, passive authentication and device control computing platform 110 may activate passive authentication functions. For instance, passive authentication and device control computing platform 110 may activate an image capture device at the user computing device by, for instance, transmitting a signal or command to the image capture device to power on or otherwise activate. Additionally or alternatively, passive authentication and device control computing platform 110 may activate a LiDAR sensor at the user computing device by, for instance, transmitting a signal or command to the LiDAR sensor to activate or otherwise power on.

At step 306, passive authentication and device control computing platform 110 may receive, at a first time and from the image capture device and the LiDAR sensor, user presence data. For instance, image data, LiDAR sensor data, and the like, may be received and analyzed to determine whether a user is present at the user computing device. In some examples, the user presence data may further include data received from a mobile device of the user, such as user mobile device 150. For instance, the user presence data may further include an indication of whether the mobile device 150 of the user is within a predefined proximity of the user computing device.

At step 308, passive authentication and device control computing platform 110 may score the user presence data. For instance, for each type of user presence data (e.g., data received from each device) a score indicating whether the user is present or not based on the analyzed data may be determined.

At step 310, passive authentication and device control computing platform 110 may receive, at the first time and from the user computing device, user interaction data. In some examples, the user interaction data may include user interactions with one or more user input devices, such as a mouse or keyboard of the user computing device. In some examples, the user interaction data may include typing speed, typing patterns, mouse speed, and the like.

At step 312, passive authentication and device control computing platform 110 may score the user interaction data. For instance, passive authentication and device control computing platform 110 may retrieve a user profile associated with the user of the user computing device and may identify from the user profile, baseline or expected user interaction data for the user of the user computing device. Passive authentication and device control computing platform 110 may compare the received user interaction data to the baseline user interaction data to determine a similarity between the data and may score the data based on the similarity. In some examples, scoring the received user interaction data may include comparing each type of user interaction data to a same type of user interaction data in the baseline user interaction data to identify the similarity.

In some examples, the baseline data may be determined based on user interaction data received from the user computing device prior to the first time. For instance, user interaction data at at least one time prior to the first time may be captured and analyzed to identify or determine the baseline user interaction data. The baseline data may then be stored in the user profile of the user. In some examples, the baseline user interaction data may be updated on a periodic or aperiodic basis.

At step 314, passive authentication and device control computing platform 110 may determine an overall score for the first time based on the received user presence data and user interaction data. For instance, passive authentication and device control computing platform 110 may some the scores of the user interaction data and the user presence data to determine an overall score for the first time.

At step 316, passive authentication and device control computing platform 110 may compare the overall score to a passive authentication threshold to determine whether the overall score is below the threshold. If not, the process may return to step 306 to receive additional user presence data and user interaction data at a second time subsequent to the first time.

If the score is below the passive authentication threshold, at step 318, passive authentication and device control computing platform 110 may identify and/or execute one or more mitigation actions. For instance, the one or more mitigation actions may include locking the user out of the user computing device to prevent access to the systems or applications via the user computing device, causing a pop-up interface to display on the display of the user computing device requesting additional authentication data, or the like. In some examples, identifying and/or executing the one or more mitigation actions may include generating a signal or command causing the user computing device to execute the one or more mitigation actions and transmitting the generated signal or command to the user computing device. In some examples, transmitting the signal to the user computing device may cause the user computing device to execute the one or more mitigation actions.

Accordingly, aspects described herein provide for continuous or near continuous authentication that is performed passively (e.g., without user interaction). These arrangements provide efficient identification to potential unauthorized activity by performing passive authentication processes throughout a workday or session at a user computing device in order to continuously ensure that the user operating the user computing device is the authorized or expected user. The arrangements described ensure that unauthorized actors who may get past an initial authentication process (e.g., have user credentials to initially log in to a computing device) are quickly identified and access revoked.

As discussed herein, the arrangements described rely on data captured from, for instance, the user computing device, mobile devices of the user, and the like. For instance, a user identity may be validated based on the user's smart watch or smart phone being within a predetermined proximity of the user computing device. Because the arrangements described herein continuously or at regular intervals monitor user data, the smart watch or smart phone being outside the expected proximity (e.g., outside of one foot, two feet, or the like) for at least a threshold or predetermined period of time (e.g., one minute, two minutes, five minutes or the like) may indicate the user is no longer present at the user computing device and may cause a mitigation action to be executed.

As discussed herein, baseline or expected user interaction data may be updated on a periodic or aperiodic basis. For instance, user baseline or expected data may be re-calculated or determined each week, every two weeks, or the like. Additionally or alternatively, the baseline data may be compared to updated baseline data and only if sufficient changes are detected may the baseline data be updated in the user profile. This may account for user changes in behaviors and may reduce the occurrence of false positives.

The arrangements described herein may also be used in shared workspaces because each user may have a user profile that stores baseline interaction data, biometric data, and the like. Upon initial authentication of the user, the user may be associated with the user computing device and data from the respective user profile may be used to validate the user's identity based on the passive authentication.

Further, aspects described herein may be integrated with one or more security platforms of an enterprise organization. For instance, security event management platforms may be integrated to receive data related to potential unauthorized activity and initial an investigation, or the like. Further, the integration may enable revocation of access for a user if an anomaly is detected until the user can be validated, which may reduce impact of potential unauthorized activity.

Figure 6:
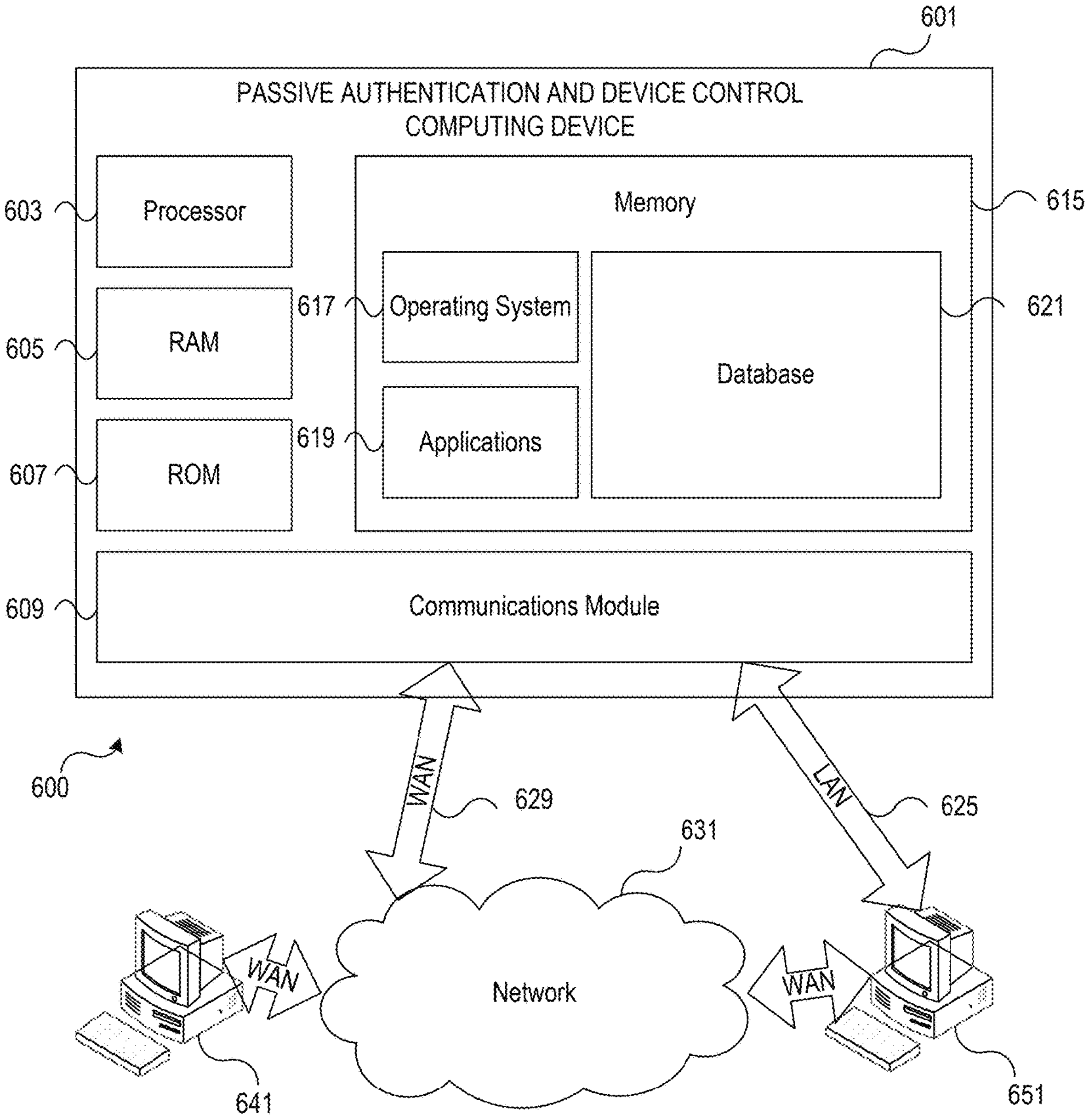
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include passive authentication and device control computing device 601 having processor 603 for controlling overall operation of passive authentication and device control computing device 601 and its associated components, including Random Access Memory (RAM) 605, Read-Only Memory (ROM) 607, communications module 609, and memory 615. Passive authentication and device control computing device 601 may include a variety of computer readable media. Computer readable media may be any available media that may be accessed by passive authentication and device control computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by passive authentication and device control computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor (e.g., hardware processor) on passive authentication and device control computing device 601. Such a processor may execute computer-executable instructions stored on a computer-readable medium.

Software may be stored within memory 615 and/or storage to provide instructions to processor 603 for enabling passive authentication and device control computing device 601 to perform various functions as discussed herein. For example, memory 615 may store software used by passive authentication and device control computing device 601, such as operating system 617, application programs 619, and associated database 621. Also, some or all of the computer executable instructions for passive authentication and device control computing device 601 may be embodied in hardware or firmware. Although not shown, RAM 605 may include one or more applications representing the application data stored in RAM 605 while passive authentication and device control computing device 601 is on and corresponding software applications (e.g., software tasks) are running on passive authentication and device control computing device 601.

Communications module 609 may include a microphone, keypad, touch screen, and/or stylus through which a user of passive authentication and device control computing device 601 may provide input, and may also include one or more of a speaker for providing audio output and a video display device for providing textual, audiovisual and/or graphical output. Computing system environment 600 may also include optical scanners (not shown).

Passive authentication and device control computing device 601 may operate in a networked environment supporting connections to one or more remote computing devices, such as computing devices 641 and 651. Computing devices 641 and 651 may be personal computing devices or servers that include any or all of the elements described above relative to passive authentication and device control computing device 601.

The network connections depicted in FIG. 6 may include Local Area Network (LAN) 625 and Wide Area Network (WAN) 629, as well as other networks. When used in a LAN networking environment, passive authentication and device control computing device 601 may be connected to LAN 625 through a network interface or adapter in communications module 609. When used in a WAN networking environment, passive authentication and device control computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
a memory storing computer-readable instructions that, when executed by the at least one processor, cause the computing platform to:
receive, from a user computing device, initial authentication data, wherein the initial authentication data includes at least a username and password for a user of the user computing device;
authenticate the user of the user computing device based on the initial authentication data, wherein authenticating the user provides access to one or more systems or applications via the user computing device;
after authenticating the user, initiate passive authentication functions, wherein initiating passive authentication functions includes:
activating an image capture device at the user computing device;
activating a light detection and ranging (LiDAR) sensor at the user computing device;
receive, at a first time and from the image capture device and the LiDAR sensor, user presence data;
score the received user presence data;
receive, at the first time and from the user computing device, user interaction data associated with the user computing device;
score the received user interaction data, wherein scoring the received user interaction data is based on a comparison between the received user interaction data and baseline user interaction data for the user;
determine, based on the scored received user presence data and the scored user interaction data, an overall score for the first time;
compare the overall score to a passive authentication threshold;
responsive to determining that the overall score is at or above the passive authentication threshold, receive additional user interaction data and user presence data at a second time for analysis; and
responsive to determining that the overall score is below the passive authentication threshold, identify and execute one or more mitigation actions.

2. The computing platform of claim 1, wherein the one or more mitigation actions include locking the user out of the user computing device and displaying a pop-up interface on a display of the user computing device.

3. The computing platform of claim 1, wherein the user interaction data includes user interactions with one or more user input devices of the user computing device.

4. The computing platform of claim 3, wherein the user interaction data includes one or more of: typing speed, typing pattern or mouse speed.

5. The computing platform of claim 1, wherein the user presence data is further received from a mobile computing device of the user.

6. The computing platform of claim 5, wherein the user presence data further includes an indication of whether the mobile computing device of the user is within a predefined proximity of the user computing device.

7. The computing platform of claim 1, further including instructions that, when executed, cause the computing platform to:
at at least one time prior to the first time, receive user interaction data with the user computing device;
generate, based on the user interaction data received at the at least one time prior to the first time, the baseline user interaction data for the user; and
store, in a user profile of the user, the baseline user interaction data for the user.

8. The computing platform of claim 1, wherein the baseline user interaction data for the user is updated on a periodic basis.

9. The computing platform of claim 1, wherein scoring the received user interaction data includes comparing each type of user interaction data to a same type of user interaction data in the baseline user interaction data for the user to identify a similarity.

10. The computing platform of claim 1, wherein identifying and executing one or more mitigation actions further includes:
generating a signal or command causing the user computing device to execute the one or more mitigation actions; and transmitting the generated signal or command to the user computing device, wherein transmitting the generated signal or command causes the user computing device to execute the one or more mitigation actions.

11. A method, comprising:

receiving, by a computing platform, the computing platform having at least one processor, and memory, and from a user computing device, initial authentication data, wherein the initial authentication data includes at least a username and password for a user of the user computing device;

authenticating, by the at least one processor, the user of the user computing device based on the initial authentication data, wherein authenticating the user provides access to one or more systems or applications via the user computing device;

after authenticating the user, initiating, by the at least one processor, passive authentication functions, wherein initiating passive authentication functions includes:

activating an image capture device at the user computing device;

activating a light detection and ranging (LiDAR) sensor at the user computing device;

receiving, by the at least one processor and at a first time and from the image capture device and the LiDAR sensor, user presence data;

scoring, by the at least one processor, the received user presence data;

receiving, by the at least one processor, at the first time and from the user computing device, user interaction data associated with the user computing device;

scoring, by the at least one processor, the received user interaction data, wherein scoring the received user interaction data is based on a comparison between the received user interaction data and baseline user interaction data for the user;

determining, by the at least one processor and based on the scored received user presence data and the scored user interaction data, an overall score for the first time;

comparing, by the at least one processor, the overall score to a passive authentication threshold;

responsive to determining that the overall score is at or above the passive authentication threshold, receiving, by the at least one processor, additional user interaction data and user presence data at a second time for analysis; and responsive to determining that the overall score is below the passive authentication threshold, identifying and executing, by the at least one processor, one or more mitigation actions.

12. The method of claim 11, wherein the one or more mitigation actions include locking the user out of the user computing device and displaying a pop-up interface on a display of the user computing device.

13. The method of claim 11, wherein the user interaction data includes user interactions with one or more user input devices of the user computing device.

14. The method of claim 13, wherein the user interaction data includes one or more of: typing speed, typing pattern or mouse speed.

15. The method of claim 11, wherein the user presence data is further received from a mobile computing device of the user.

16. The method of claim 15, wherein the user presence data further includes an indication of whether the mobile computing device of the user is within a predefined proximity of the user computing device.

17. The method of claim 11, further including:

at at least one time prior to the first time, receiving, by the at least one processor, user interaction data with the user computing device;

generating, by the at least one processor and based on the user interaction data received at the at least one time prior to the first time, the baseline user interaction data for the user; and storing, in a user profile of the user, the baseline user interaction data for the user.

18. The method of claim 11, wherein scoring the received user interaction data includes comparing each type of user interaction data to a same type of user interaction data in the baseline user interaction data for the user to identify a similarity.

19. The method of claim 11, wherein identifying and executing one or more mitigation actions further includes:

generating, by the at least one processor, a signal or command causing the user computing device to execute the one or more mitigation actions; and transmitting, by the at least one processor, the generated signal or command to the user computing device, wherein transmitting the generated signal or command causes the user computing device to execute the one or more mitigation actions.

20. One or more non-transitory computer-readable media storing instructions that, when executed by a computing platform comprising at least one processor, memory, and a communication interface, cause the computing platform to:

receive, from a user computing device, initial authentication data, wherein the initial authentication data includes at least a username and password for a user of the user computing device;

authenticate the user of the user computing device based on the initial authentication data, wherein authenticating the user provides access to one or more systems or applications via the user computing device;

after authenticating the user, initiate passive authentication functions, wherein initiating passive authentication functions includes:

activating an image capture device at the user computing device;

activating a light detection and ranging (LiDAR) sensor at the user computing device;

receive, at a first time and from the image capture device and the LiDAR sensor, user presence data;

score the received user presence data;

receive, at the first time and from the user computing device, user interaction data associated with the user computing device;

score the received user interaction data, wherein scoring the received user interaction data is based on a comparison between the received user interaction data and baseline user interaction data for the user;

determine, based on the scored received user presence data and the scored user interaction data, an overall score for the first time;

compare the overall score to a passive authentication threshold;

responsive to determining that the overall score is at or above the passive authentication threshold, receive additional user interaction data and user presence data at a second time for analysis; and responsive to determining that the overall score is below the passive authentication threshold, identify and execute one or more mitigation actions.

* * * * *